US005254980A

United States Patent [19]

Hendrix et al.

[11] Patent Number: 5,254,980

[45] Date of Patent: Oct. 19, 1993

[54] DMD DISPLAY SYSTEM CONTROLLER

[75] Inventors: Henry D. Hendrix, Roswell, Ga.; Paul M. Urbanus, Dallas, Tex.; Masaho Asahara, Norcross, Ga.

[73] Assignee: Texas Instruments Incorporated, Dallas, Tex.

[21] Appl. No.: 756,007

[22] Filed: Sep. 6, 1991

[51] Int. Cl.[5] .......................... G09G 3/34; H04N 5/44

[52] U.S. Cl. ....................................... 345/84; 358/188

[58] Field of Search ............... 340/783, 784, 785, 786, 340/787, 788; 358/188, 160, 230, 240, 241

[56] References Cited

U.S. PATENT DOCUMENTS 4,481,511 11/1984 Hanmura et al. .................. 340/784
4,745,485 5/1988 Iwasaki .............................. 340/784
4,816,816 3/1989 Usui ..................................... 340/784
4,901,066 2/1990 Kobayashi et al. ................. 340/783
4,963,860 10/1990 Stewart .............................. 340/784
4,985,698 1/1991 Mano et al. ......................... 340/784

*Primary Examiner*—Richard Hjerpe
*Attorney, Agent, or Firm*—James C. Kesterson; Richard L. Donaldson

[57] ABSTRACT

A method and structure for providing system control to a spatial light modulator display are disclosed. The control functions are divided into smaller, easier to implement control blocks and coordination between them is provided. The smaller blocks are a memory controller, a modulator controller and a formatter controller.

14 Claims, 5 Drawing Sheets

DMD DISPLAY SYSTEM CONTROLLER

BACKGROUND OF THE INVENTION

1. Related Applications

This application is related to U.S. Ser. No. 678,761, filed Apr. 2, 1991. The following applications have been filed copending with this application: U.S. Ser. No. 755,981; U.S. Ser. No. 755,883, and U.S. Ser. No. 756,026.

2. Field of the Invention

This invention relates to the field of display systems, more particularly to controllers for digital spatial light modulator displays.

3. Background of the Invention

Standard televisions systems operate from an analog signal that drives a cathode ray tube (CRT) gun in a line-by-line rasterized fashion. Digital sampling of the analog signal allows for corrections in the signal that may be necessary because of faulty or poor quality transmission. Additionally, digital signal processing of the sampled signals can increase picture quality even in systems that do not require correction.

A unique problem arises when digital television uses an array of spatial light modulator devices. These spatial light modulators require a different data input series that the standard rasterized format. The digital samples must be manipulated to ensure the correct data gets to the proper row and column in the spatial light modulator array. A module that achieves such a function is shown in the related application, Ser. No. 755,981. Memory management schemes that allow this to work are shown in the related applications Ser. No. 755,883, and Ser. No. 756,026.

The overall concern is the coordination of the module that achieves the data manipulation, the memory management schemes, and the spatial light modulator array. Obviously, some kind of system controller is needed to provide the unique signals necessary to monitor and coordinate this system.

SUMMARY OF THE INVENTION

Objects and advantages will be obvious, and will in part appear hereinafter and will be accomplished by the present invention which provides a system controller for a digital spatial light modulator display. The controller contains as a minimum three subcontrollers. These subcontrollers regulate and coordinate operations between separate parts of the systems: the spatial light modulator; the memory; and the data processing module. It is an advantage of the invention that it is adaptable, efficient and possesses a stream-lined functionality limiting the number of signals necessary for control.

BRIEF DESCRIPTION OF THE DRAWINGS

For a complete understanding of the invention, and the advantages thereof, reference is now made to the following description in conjunction with the accompanying drawings, in which.

DETAILED DESCRIPTION OF THE PREFERRED EMBODIMENT

Figure 1:
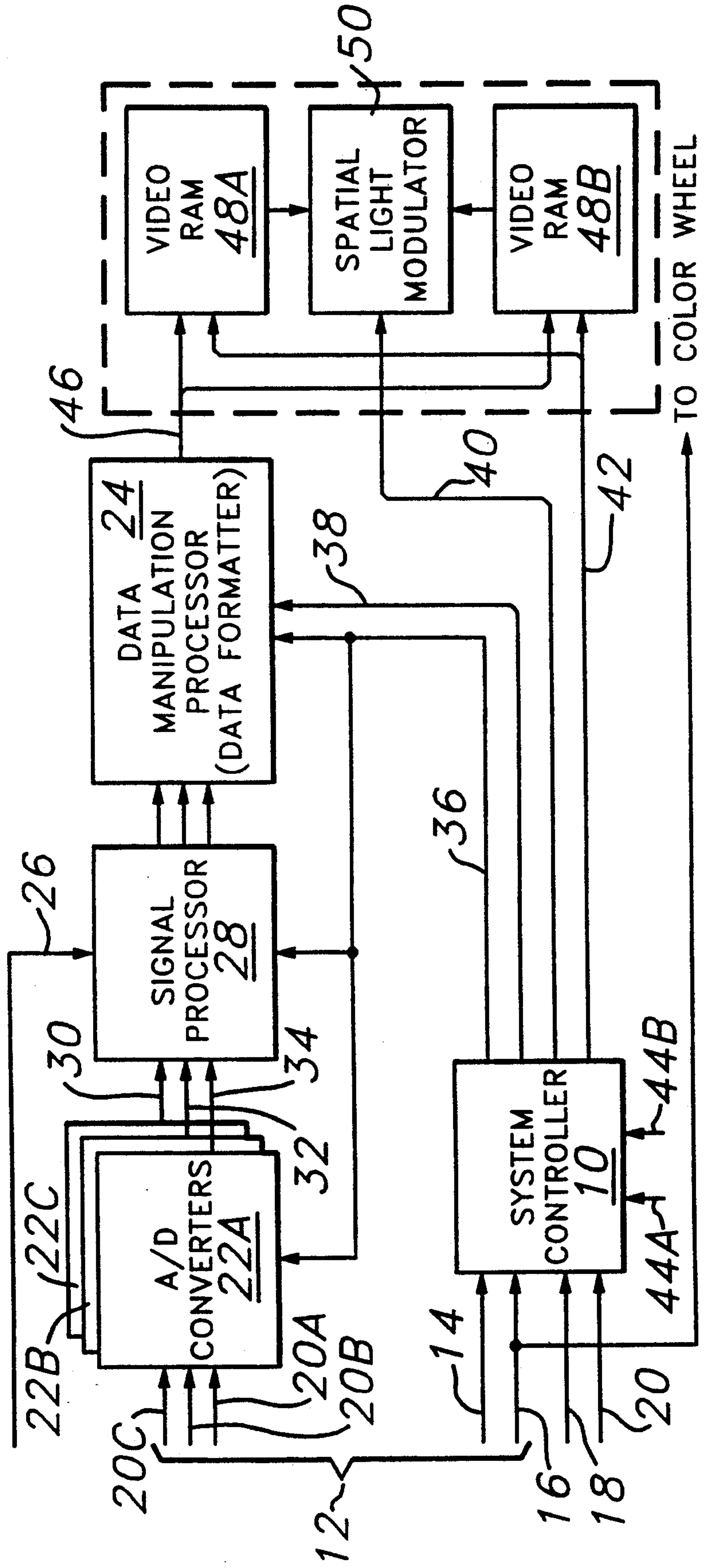
FIG. 1 shows an overall system which contains a system controller.

One embodiment of the invention is shown as part of an overall spatial light modulator television system. The data is received from a video source on a set of input lines 12. The system controller directly receives lines 14 and 16 which are the horizontal and vertical synchronization signals from the video source. The vertical synchronization signal is also sent to the color wheel. Received from the color wheel is the color wheel lock signal 18, which relates its current status. Also provided to the controller is the power fail signal 20, which monitors the power status. These signals will be discussed in greater detail in further drawings. To allow flexibility for either front or rear projection, inputs 44A and 44B allow for a vertical or horizontal flip of the data, as determined by a switch selected by the user. The outputs to be produced from the system controller 10 are used to coordinate operation between the data manipulation processor 24, herein referred to as the data formatter, the spatial light modulator array 50, and the memory, shown here as two video RAMs, 48A and 48B, where 48A is video RAM for the upper half of the array of spatial light modulator, and video RAM 48B is for the lower half of the modulator array. One of these outputs is the sample clock which is sent to the analog-to-digital (A/D) converters 22A, 22B, and 22C. These A/D converters produce the digitized color data that enters the converters on the three lines 20A, 20B, and 20C. Data is passed from the three converters on lines 30, 32, and 34. In order to provide the proper data in the proper format, 640 samples, one sample per pixel, the sample clock is used. The size of the lines 30, 32, and 34 is only limited by the designer's imagination. In this embodiment, the data is produced in 10-bit samples, therefor the lines must be 10-bit data busses.

Many types of signal processing can be done to enhance these signals. One possible processing method is to perform gamma correction, which is done in module 28, This can be done, for example, by over sampling the data in 10-bit samples, then mapping the data into 8-bit samples. Regardless of what signal processing is done, this module also requires the input of the sample clock generated by the system controller for synchronization. When the data is finally passed to the data formatter module 24, the sample clock is used to coordinate the transfer between the two modules.

Additionally, the data formatter is provided with control signals on data bus, 38. The specific contents of the data bus are discussed in further detail in later drawings. Another set of output signals is provided to the spatial light modulator array 50 on bus 40. Additional outputs must be provided to the video RAMs (VRAM) 48A and 48B, in the memory module, on bus, 42.

Figure 2:
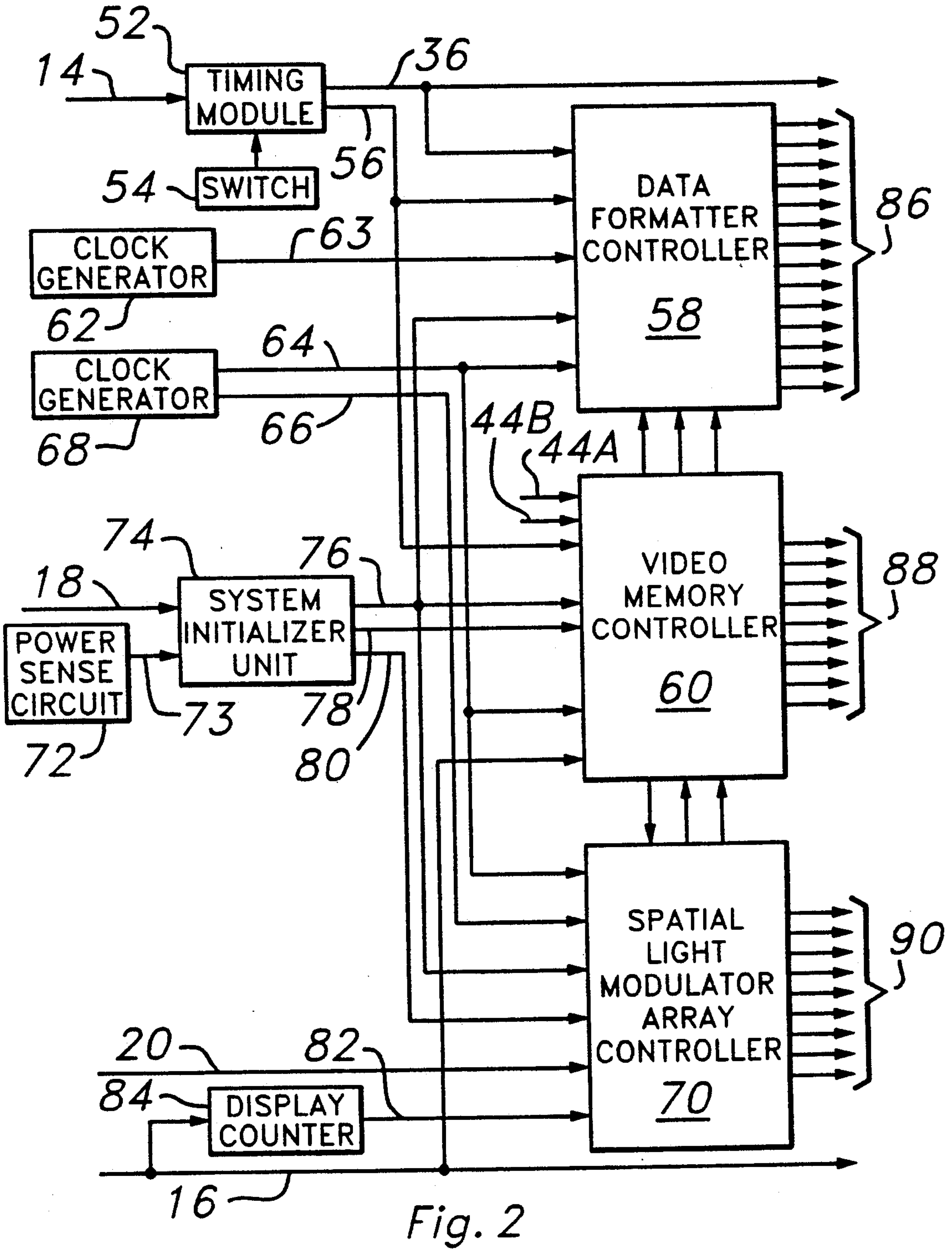
FIG. 2 shows a functional block diagram of a system controller.

The internal functions of the system controller are shown in FIG. 2. The control functions are broken into a separate block for each major area of control required, a memory controller 60, a spatial light modulator array controller 70, and a data formatter controller 58. Horizontal synchronization signal 14 is used in module 52 with an input signal from switch 54 to produce the sample clock signal on line 36. Also produced from the module 52 is the horizontal blanking signal 56 which is used to blank parts of the line as required for proper data display. This signal is provided to the data formatter controller 58 and video memory (VRAM) controller 60.

A clock generator 62 produces a clock to drive the write signals for the formatter, allowing it to operate at a different speed than the rest of the system, for optimal system efficiency. A second clock generator 68 provides two clock signals, one 64, which is sent to the formatter controller, the memory controller, and the modulator controller to coordinate the read operations from the data formatter to the memory array. The other, 66, is sent to the modulator controller to coordinate the read operations from the memory array to the modulator.

The color wheel lock signal 18 is input to system initializer unit 74, which coordinates the initial states of the system at initial startup, or any other loss of synchronization between the display and the color wheel, such as channel changes. An additional input signal, power on reset 73, is generated by the power sense circuit at power up of the system. This module generates at least three signals. System reset signal 76, which is sent to all three subcontrollers, provides the coordination to reset the system when necessary. Additional signals, 78 and 80 are provided to the VRAM controller and the modulator controller respectively. Signal 78 is sent to the VRAM controller to initialize a first-input-first-output (FIFO) buffer, which will be described in more detail in another drawing. A modulator array blanking signal 80 is sent to the modulator array to blank out the array to prevent the display of incorrect data due to lack of system synchronization.

Additional inputs to the VRAM controller are lines 44A and 44B mentioned previously. These are used to direct the storage of the data to allow flexibility in selection of either front or rear projection, since the order the data is stored and accessed determines whether the data is displayed for a front or a rear projection screen. Line 44A provides for left-right, or east-west, flip of the data. Line 44B provides for bottom-top, or north-south, flip of the data.

The inputs to the spatial light modulator controller have mostly been discussed above. An additional signal 82, which is a display count produced by module 84, from vertical synchronization input signal 16, is input to the modulator controller. The power fail signal 20, is input to the modulator controller to regulate the power down operation of the modulator array.

In summary, the signals provided to the data formatter controller 58 are as follows: the sample clock 36; horizontal blanking signal 56; formatter write clock 63; system reset 76; and data formatter read clock 64. The signals provided to the VRAM controller 60 are east-west flip signal 44A; north-south flip signal 44B; horizontal blanking signal 56; system reset 76; FIFO initialization 78; data formatter read clock 64, and vertical synchronization 16. The inputs to the modulator controller are: data formatter read clock 64; memory read clock 66; blanking signal 80; power fail signal 20; and display count 82. The outputs from each subcontroller, output groups 86, 88, and 90, are discussed in detail in following drawings.

Figure 3:
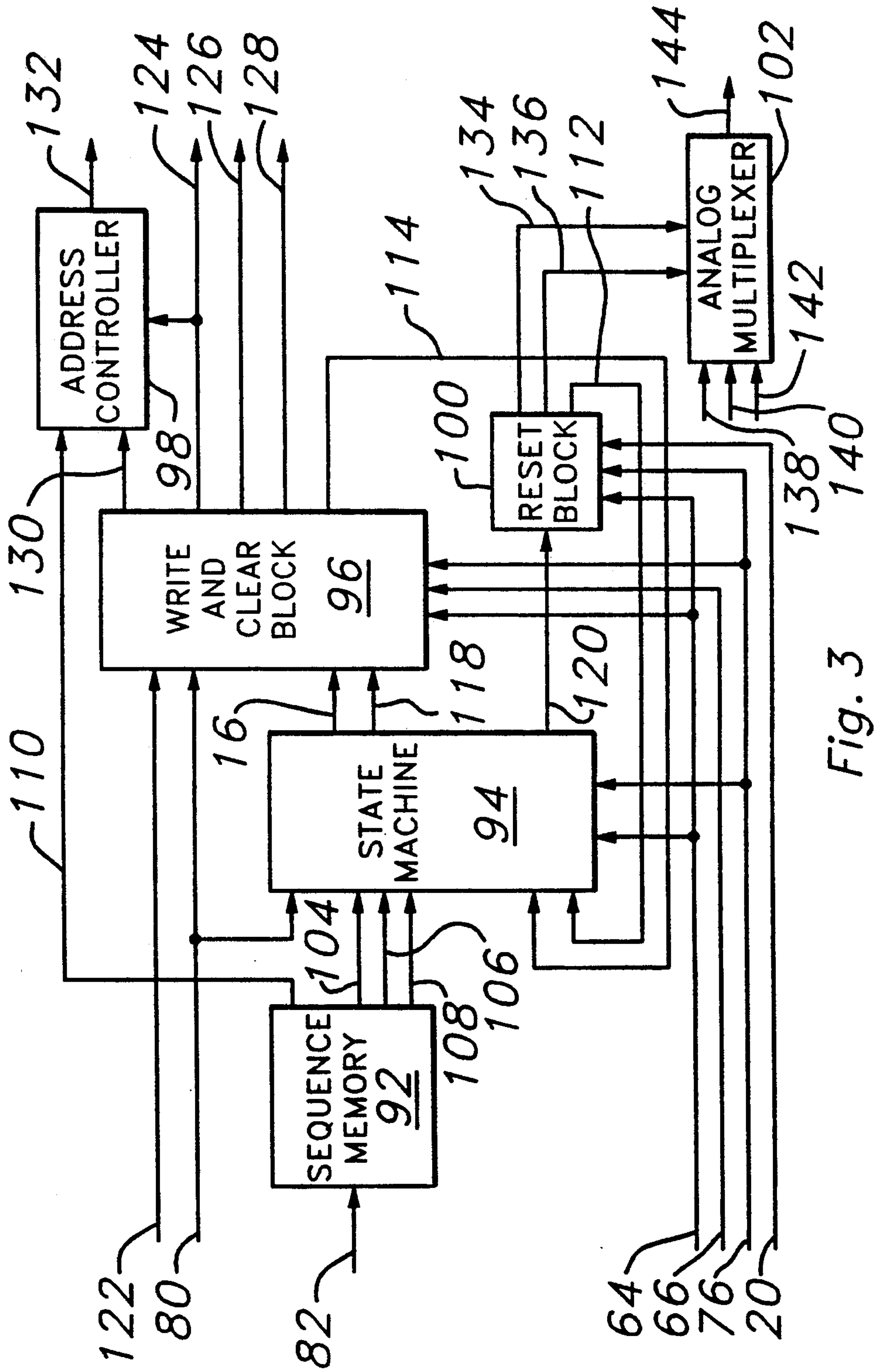
FIG. 3 shows a block diagram of a spatial light modulator controller.

A more detailed diagram of the functions contained in the spatial light modulator controller is shown in FIG. 3. The modulator controller consists of a sequence memory 92, in this example a 1K×8 memory, a state machine 94, a write and clear block 96, an address controller 98, a reset block 100, and a analog multiplexer 102, to control the reset of the mirrors to their next state.

The sequence memory 92, has as its sole input the display count signal 82. The sequence memory generates a reset signal for the state machine 94, on line 104. Additionally, the sequence memory provides a write signal 106, and a clear signal 108 to the state machine. A signal 110 containing the bit number, and the color number currently being used is sent to the address controller 98 from the sequence memory 92. This memory allows the control of the sequence of events. It is flexible enough to allow for different sequences, thus it can be adjusted for any system.

The state machine 94 controls the state of the modulator controller. It has as its inputs the reset 104, write 106, and clear 108 signals mentioned previously. Additionally, it receives the modulator blanking signal 80, which notifies the state machine as to the desired blanking status of the modulator array. Two inputs are generated from the reset block 100, and the write and clear block 96. The reset block 100 provides the state machine with the status of the reset circuit on line 112. The write and clear block sends back a response indicating the status of the modulator blanking operation on line 114. All of these inputs are used in the state machine to determine which operations are being performed, i.e., what state the controller should be in. After this is decided by the state machine, it outputs an enable signal. If writing is to be done, write enable is sent to the write and clear block on line 116. If the modulator is to be cleared, clear enable is sent to the write and clear block 96 on line 118. If the device is to be reset, reset enable is sent to the reset block 100 on line 120.

The write and clear block 96 controls the operation of the writing or clearing of the modulator array. Additional inputs to this block are the memory read clock 66, the modulator blanking signal 80 and a transfer stop signal 122. In order for modulator to have data to display, it must request the data be transferred to the output register of the video RAM by the video RAM controller 148. When the transfer of data is complete and the data can be loaded into the modulator array, a transfer stop signal 122 is sent to the write and clear block to indicate that the data is available. The write and clear block then enables writing the data to the array. When the data has been written and displayed, and new data is required, the write and clear block generates the transfer request on line 124. This line also goes to the address control block 98 to enable the transfer address required by the VRAM for the transfer operation. Another output of the write and clear block is the VRAM serial clock signal 126, which drives a serial clock in the VRAM. The desired data in the VRAM is transferred from the actual memory into a shift register. The data in the shift register is then read serially by the input circuitry of the modulator under control of the serial clock signal 126. The signals required to control the writing and blanking of the modulator array are provided on modulator control line 128. The final output data provided by the write and clear block is the number of the VRAM row which contains the desired block of data. This signal is sent on line 130 to the address controller 98.

The address controller takes its inputs, the bit number and color number on line 110, the vertical row on line 130, and the transfer request signal on line 124, and produces a transfer address on line 132. The transfer address determines to what address data is transferred from in the VRAM to the shift register which will ultimately be output to the modulator.

The final two functions provided by the modulator controller are due to the preferred embodiment of the present invention which uses an array of deformable mirrors. Each mirror in the array is addressed by its own separate electrode, which causes the mirror to flip in one of two directions if the electrode is loaded with data. The light from a source is then directed upon the array, and the light reflected from the mirrors flipped in one direction is used in the display. The reset signals previously discussed are necessary to allow the mirrors to accept their new data. In order to accomplish this, the reset block 100 and the analog multiplexer 102 are used. The reset block 100 has as its inputs the reset enable signal, 120, from the state machine 94, clock signal 64, system reset signal 76, and the power fail signal 20. In return, this block generates the reset done signal 112, which is provided to the state machine. It also provides a reset voltage enable and a bias voltage enable to the analog multiplexer on lines 134 and 136, respectively. The analog multiplexer takes those two inputs along with a ground voltage signal 138, a reset voltage 140, and a bias voltage 142 and produces an analog voltage level 144 used to reset the mirrors to their new data states.

Figure 4:
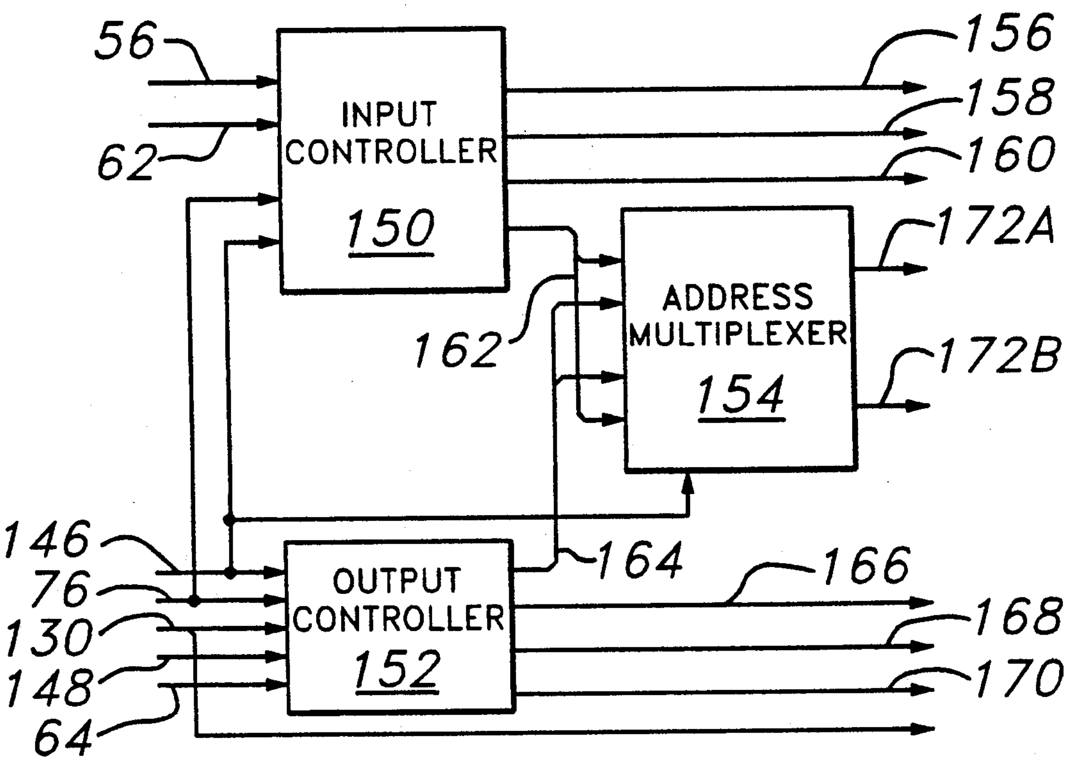
FIG. 4 shows a block diagram of a processing module controller.

A more detailed view of the data formatter controller 58 from FIG. 2, is shown in FIG. 4. The formatter functions are divided into an input controller 150, an output controller 152, and an address multiplexer 154. The input controller 150 has as its inputs the horizontal blanking signal 56, which determines what portion of the line is being blanked, and the formatter write clock 62, which controls when data is being written to the formatter. Additional inputs are the line number least-significant-bit 146, which determines whether it is an odd or even line currently being used. The input controller generates as its outputs FIFO control signals 156, which are used to write to a FIFO buffer in front of the data formatter, a write enable mask 158, which is used to determine which block of memory in the formatter is being written to. The FIFO mentioned above is not necessary for operation of the system, but it is convenient to store the data in the FIFO to allow for better coordination in the system. Details of the formatter architecture are contained in the related application, U.S. Ser. No. 755,981. The write enable mask is used in conjunction with the write enable clock output from the input controller on the line 160. The final output of the input controller is the write address 162 for the formatter which is sent to the address multiplexer 154.

The output controller 152 determines what addresses of the data formatter memory blocks are accessed to provide data to the VRAM. The inputs to this module are the line number least-significant-bit 146, which determines whether the line number is odd or even, the system reset signal 76, the bit and color number 130 from the memory controller, a read enable signal from the VRAM controller 148, and the clock signal to coordinate the reads from the formatter to the VRAM, 64. The output control has as its outputs a read address 164, which determines from which address the formatter is read, a bit select signal 168 which determines which bit of the output word is being sent to the VRAM in what order, and output clocks 170, which time the output operations.

The address multiplexer 154 uses signals 162, the write address from the input controller 150, and the read address 164 from the output controller 152, in two different lines. The formatter in this embodiment is assumed to actually have two sets of formatter circuitry within it. This allows for data to be read into one set to be formatted, while the other provides formatted data to be read out of it to the VRAMs. The address multiplexer 154 then has as its outputs two addresses. Line 172A contains either the read or write address for the first set of formatter circuitry, and line 172B contains either the read or write address for the second set of formatter circuitry. These outputs are then sent to the formatter.

Figure 5:
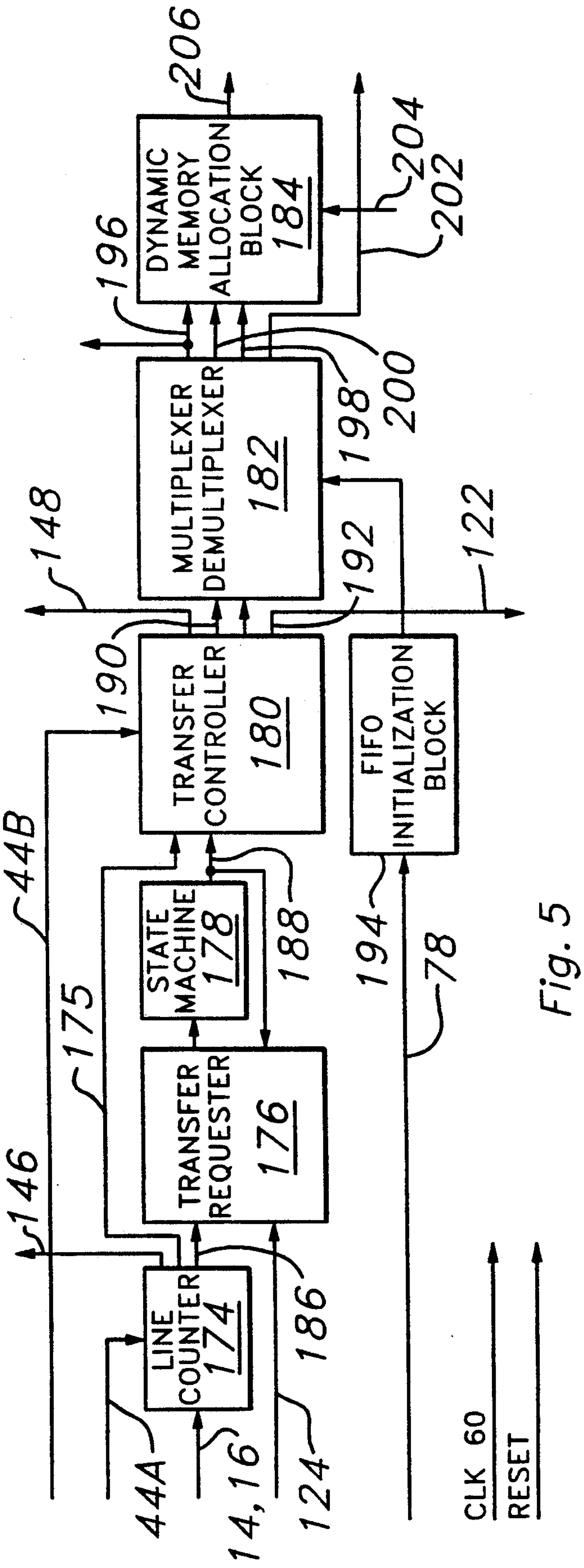
FIG. 5 shows a block diagram of a memory controller.

The detailed functions provided by the VRAM controller are shown in FIG. 5. The VRAM controller functions are broken down into a line counter 174, a refresh, write, and transfer requester 176, a state machine 178, a refresh, write, and transfer controller 180, a multiplexer/demultiplexer 182, and a memory allocation block 184. The line counter 174 tracks the line number 120 of the current active lines, and the line number is used by the refresh, write, and transfer controller to generate the write address. The line counter sends to the requester 176 signals on line 186 specifying either a refresh, or a write to the VRAM. Which is sent is determined by one of many ways. The refresh must be completed at least three times every frame for this VRAM, but refreshing depends on the actual implementation of the memory. Writes must be done every line of the active portion of the video frame. These signals are sent to the requester block 176 which determines what request must be processed. An additional input to the line counter is the north-south flip input 44A. This is necessary, since a north-south flip affects which line number is read at which time. If the data is stored line 1-240 (for one half of a 480 line array), and a north-south flip is desired, the data must be read out as 240-1.

The requester block 176 sends the appropriate request code to the state machine. Its inputs are the request line from the line counter 186 and transfer request from the modulator controller on line 124. The requester sends its request to the state machine 178. The state machine then sends back a signal 188 that designates which state the VRAM controller is currently in. The requester uses this data in determining what request should be processed next. The transfer request 124 must be processed after the output shift register is emptied. In this example, the output shift register is decided to be 256 bits long. Sixteen bits of each binary weight of data is stored for each line in each block for every binary weight. Therefore, the data for 16 lines can be shifted into the shift register. So a transfer request must be made after every sixteenth line is read.

The state machine 178 also sends the signal 188 to the refresh, write, and transfer controller 180. The controller uses the input from the state machine to time the various operations so the data is available for read and write at the appropriate time. An additional input to this block is the input signal 44B, the east-west flip signal. This signal affects what order the data is stored or read from the VRAM for each line, as the order determines whether or not the data is flipped. The controller 180 has as its outputs several control signals on line 190 that are used to time the various operations, addresses on line 192, which determine where the data is to be sent, the transfer stop signal 122, which tells the modulator controller that data is available, and the read enable signal 148 which signals the formatter controller to begin outputting data.

The control signals 190 and the addresses 192 are sent to the multiplexer/demultiplexer block 182. An additional block providing input to block 182 is the FIFO initialization block 194 which has as its only input the FIFO initialization signal 78. The FIFO initialization block provides a control/address input that loads the data into the memory allocation FIFO for proper operation upon start-up. This FIFO is not to be confused with the FIFO used in the formatter. The multiplexer/-demultiplexer block then selects the address for the mapping table on line 196, based upon the current operational state. The use of the mapping table is discussed in further detail in the related application Ser. No. 755,883. Additional outputs are then sent to the dynamic memory allocation block 184.

The VRAM address 198, the mapping table control 200, and the VRAM control 202 are all output by the multiplexer/demultiplexer block. The VRAM control signal is sent straight to the VRAM. A final input 204 to the memory allocation block 184 is the address 132 of the data that is being transferred into the VRAM shift register, which comes from the modulator controller 206. All of these inputs are used to determine the final VRAM address for writing data from the formatter module, refreshing the VRAM and reading data from the VRAM. The data for all of the rows and columns of the array for an entire frame is stored in the VRAM before the data is written to the modulator. While all of that frame's data is being read out of the VRAM, another frame is being stored, and the entire signal generation process repeats.

Thus, although there has been described to this point a particular embodiment for a method and structure for controlling a spatial light modulator television, it is not intended that such specific references be considered as limitations upon the scope of this invention except in-so-far as set forth in the following claims.

What is claimed is:

1. A method for controlling a spatial light modulator display system comprising:

a. dividing the display system control, and data transfer functions into a data formatter controller to supply address and control signals to at least one data formatter, a memory controller to control at least one video memory, and a modulator controller to supply address and modulator control signals to at least one spatial light modulator; and b. generating signals between said controllers to coordinate the addressing, reading, writing, and transferring of data between a data formatter, a memory, and a modulator, such that said transfers are done to provide said data and said modulator control signals to said modulator.

2. The method of claim 1 wherein said dividing step further comprises dividing said formatter controller into an input controller to govern the write address of said formatter, an output controller to govern the read address of said data formatter and a address multiplexer to multiplex said read and write addresses from the input and output controllers.

3. The method of claim 1 wherein said dividing step further comprises;

a. dividing said memory controller into;

i. a line counter to track the current active line number;

ii. a requester to initiate refresh and transfer operations;

iii. a state machine to coordinate the operations of said memory controller;

iv. a transfer controller to coordinate said reading and writing of data to and from said memory;

v. a multiplexer/demultiplexer to select mapping table addresses based on current operational state;

vi. a first-in-first-out buffer initializer to control an optional first-in-first-out buffer memory; and vii. a dynamic memory allocator to control writing data to, reading data from, and refreshing of said video memory;

b. generating signals between said line counter, said requester, said state machine, said transfer controller, said multiplexer/demultiplexer, said buffer initializer, and said dynamic memory allocator to coordinate the reading and writing of data to, and refreshing of, a video memory.

4. The method of claim 1 wherein said dividing step further comprises;

a. dividing said modulator controller into;

i. a sequence memory to control the sequence of events;

ii. a state machine to control the state of said modulator controller;

iii. a write and clear function to control writing to and clearing of said modulator;

iv. a reset controller to coordinate the reset of said modulator;

v. an address controller to determine the video memory address from which data is read;

vi. and an analog multiplexer to select the required modulator bias voltage;

b. generating signals between said memory, said state machine, said write and clear function, said reset controller, said address controller, and said analog multiplexer to coordinate the transfer of data to, and the display of data upon, a spatial light modulator.

5. The method of claim 1 wherein said dividing step further comprises dividing said memory controller into a state controller circuit to coordinate the operation of the memory controller and to track display line number; and an address generation circuit which receives control and line number signals from the state controller circuit and controls reading, writing, and refreshing of the video memory and coordinates the operations of the memory controller with the formatter controller and modulator controller.

6. The method of claim 1 wherein said dividing step further comprises dividing said modulator controller into a state controller circuit to coordinate the operation of the modulator controller and an address and control circuit which receives control signals from the state controller and controls writing to and biasing of the spatial light modulator.

7. A system controller for a spatial light modulator display system comprising:

a. a modulator controller to control at least one spatial light modulator;

b. a memory controller to control at least one video memory;

c. a formatter controller to supply address and control signals to at least one data formatter;

d. signals between said modulator controller and said memory controller, between said modulator controller and said formatter controller, and between said memory controller and said formatter controller, to coordinate the operations of at least one formatter, at least one memory, and at least one modulator and to coordinate the transfers of data between said formatter, said memory, and said modulator, said operations and transfers performed to accurately represent a visual image upon said modulator.

8. The controller of claim 7 wherein said formatter controller further comprises an input controller to govern the write address of said data formatter, an output controller to govern the read address of said data formatter, and a address multiplexer to multiplex said read and write addresses.

9. The controller of claim 7 wherein said memory controller further comprises a. a line counter to track the current active line number;

b. a requester to initiate refresh and transfer operations;

c. a state machine to coordinate the operations of said memory controller;

d. a transfer controller to coordinate read and write operations;

e. a multiplexer/demultiplexer to select mapping table addresses based on current operational state;

f. a first-in-first-out buffer initializer to control an optional first-in-first-out buffer memory;

g. a dynamic memory allocator to control writing data to, reading data from, and refreshing of said video memory; and h. signals between said line counter, said requester, said state machine, said transfer controller, said multiplexer/demultiplexer, said buffer initializer, and said dynamic memory allocator to coordinate the reading and writing of data to, and refreshing of, at least one video memory.

10. The controller of claim 7 wherein said modulator controller further comprises;

a. a sequence memory to control the sequence of events;

b. a state machine to control the state of said modulator controller;

c. a write and clear function to control writing to and clearing of said modulator;

d. a reset controller to coordinate the reset of said modulator;

e. an address controller to determine the video memory address from which data is read;

f. an analog multiplexer to select the required modulator bias voltage; and g. signals between said memory, said state machine, said write and clear function, said reset controller, said address controller, and said analog multiplexer to coordinate the transfer of data to, and the display of data upon, at least one spatial light modulator.

11. The controller of claim 7 wherein said memory controller further comprises a state controller circuit to coordinate the operation of the memory controller and to track display line number; and an address generation circuit which receives control and line number signals from the state controller circuit and controls reading, writing, and refreshing of the video memory and coordinates the operations of the memory controller with the formatter controller and modulator controller.

12. The controller of claim 7 wherein said modulator controller further comprises a state controller circuit to coordinate the operation of the modulator controller and an address and control circuit which receives control signals from the state controller and controls writing to and biasing of the spatial light modulator.

13. The system controller of claim 7 wherein said memory controller also provides circuitry to allow reversing the display of the video data from top to bottom of the spatial light modulator and independent circuitry to allow reversing the display of the video data from left to right of the spatial light modulator.

14. The system controller of claim 7 wherein said system controller also provides circuitry to synchronize the display system to an external color wheel.

* * * * *